United States Patent
Zhao

(10) Patent No.: US 10,717,882 B2
(45) Date of Patent: Jul. 21, 2020

(54) HYDROPHOBIC ANTI-SETTLING FAR-INFRARED ABSORBER MATERIAL AND MANUFACTURING METHOD THEREOF, AND KITCHEN APPLIANCE PRODUCT AND MANUFACTURING METHOD THEREOF

(71) Applicants: GUANGDONG MIDEA KITCHEN APPLIANCES MANUFACTURING CO., LTD., Foshan (CN); MIDEA GROUP CO., LTD., Foshan (CN)

(72) Inventor: Li Zhao, Foshan (CN)

( * ) Notice: Subject to any disclaimer, the term of this patent is extended or adjusted under 35 U.S.C. 154(b) by 0 days.

(21) Appl. No.: 16/368,905

(22) Filed: Mar. 29, 2019

(65) Prior Publication Data

US 2019/0225820 A1  Jul. 25, 2019

Related U.S. Application Data

(63) Continuation of application No. PCT/CN2017/103716, filed on Sep. 27, 2017.

(30) Foreign Application Priority Data

Sep. 29, 2016 (CN) .......................... 2016 1 0865026

(51) Int. Cl.

| | |
|---|---|
| C09D 5/32 | (2006.01) |
| C09D 183/04 | (2006.01) |
| C09D 7/40 | (2018.01) |
| A47J 36/04 | (2006.01) |
| C09D 7/45 | (2018.01) |
| B05D 1/02 | (2006.01) |
| B05D 3/00 | (2006.01) |
| C09D 7/20 | (2018.01) |
| C09D 5/18 | (2006.01) |
| C09D 7/61 | (2018.01) |
| A47J 36/02 | (2006.01) |
| C09D 1/00 | (2006.01) |

(52) U.S. Cl.
CPC .............. *C09D 5/32* (2013.01); *A47J 36/027* (2013.01); *A47J 36/04* (2013.01); *B05D 1/02* (2013.01); *B05D 3/007* (2013.01); *C09D 1/00* (2013.01); *C09D 5/18* (2013.01); *C09D 7/20* (2018.01); *C09D 7/45* (2018.01); *C09D 7/61* (2018.01); *C09D 7/70* (2018.01); *C09D 183/04* (2013.01)

(58) Field of Classification Search
CPC combination set(s) only.
See application file for complete search history.

(56) References Cited

FOREIGN PATENT DOCUMENTS

| CN | 105621889 A | 6/2016 |
|---|---|---|
| CN | 105925023 A | 9/2016 |
| CN | 106398336 A | 2/2017 |
| CN | 106398336 B | 9/2018 |

OTHER PUBLICATIONS

The Office Action dated Apr. 1, 2020 corresponding to JP Application No. 2019-517331.

*Primary Examiner* — Monique R Peets
(74) *Attorney, Agent, or Firm* — Kilpatrick Townsend & Stockton, LLP

(57) ABSTRACT

A hydrophobic anti-settling far-infrared absorber material and manufacturing method thereof, and kitchen appliance product and manufacturing method thereof. The hydrophobic anti-settling far-infrared absorber material comprises, in parts by weight, the following components: 52-80 parts of a binder, 0.5-2 parts of an absorber, 10-20 parts of a far-infrared powder agent, 5-10 parts of a solvent, 1-15 parts of an anti-settling agent, and 0.8-1.5 parts of an adjuvant. The manufacturing method of the absorber material comprises mixing portions according to the proportions. The kitchen appliance product is obtained by spray coating the absorber material on a surface of a substrate of the kitchen appliance product, and curing the same to form a coating layer.

14 Claims, No Drawings

HYDROPHOBIC ANTI-SETTLING FAR-INFRARED ABSORBER MATERIAL AND MANUFACTURING METHOD THEREOF, AND KITCHEN APPLIANCE PRODUCT AND MANUFACTURING METHOD THEREOF

CROSS-REFERENCE

This application is a continuation of International Application No. PCT/CN2017/103716, filed on Sep. 27, 2017, which claims priority to the Chinese Application No. 201610865026.1, filed on Sep. 29, 2016, which are incorporated herein by reference in their entireties.

FIELD

The present disclosure relates to a coating field, and more particularly to a hydrophobic anti-settling far-infrared absorbing material, a method for preparing a hydrophobic anti-settling far-infrared absorbing material, a kitchen appliance product and a method for preparing a kitchen appliance product.

BACKGROUND

It is well known that absorbers used in the microwave industry are usually ferrites, carbides, nitrides and the like having a high density, and are mixed with binders and solvents to prepare absorbing materials. However, after the materials are stored for a period of time, sedimentation of the absorbers occurs, which negatively affects the coating process of the absorbing materials, thus negatively affecting the actual absorbing effect of the absorbing materials and the temperature stability. In this case, the temperature is more likely to be very high, thus causing safety problems.

In addition, when microwave appliances made of such absorbing materials are used for cooking, the food may have an over-cooked surface and uncooked insides, causing unsatisfied cooking results and thus affecting the consumer experience.

The above problems negatively affect the application of the absorbing materials in the microwave industry, thus making the absorbing materials unable to meet the growing demands of baking and cooking.

The absorbing material technology of the existing microwave industry mainly relates to procedures of adding the high-density absorber into the silica gel binder, adding a proper amount of an adjuvant, mechanical stirring, vulcanizing and cross-linking the mixture, pressing into a silica absorbing sheet having a thickness of about 2 mm (i.e., preparing the final absorbing layer), and adhering the absorbing sheet to the surface of the substrate with an adhesive to form a microwave absorbing appliance. However, a microwave baking tray made by above method has following disadvantages.

1. The absorber is not uniformly dispersed and easy to settle, which will result in a big difference in microwave absorbing properties of products having the same specification type in the same batch, and even cause a local overheating and melting of the products.

2. A large amount of the resin material such as a silica gel is used, resulting in an excessively thick absorbing layer.

3. The product has no far-infrared performance, and thus the inside of the food is not well-cooked.

4. The production process is complex, time-consuming and costly.

5. The product has no hydrophobic property and oily will be easily adhered after the product is used for a period.

In view of the fact that a coating type of an absorbing material is rarely seen in the art of the microwave industry, it is impossible to find an absorbing material having anti-settling, far-infrared and stable absorbing properties. Due to the complex process, the thick sheet and the lack of hydrophobic and oleophobic properties of the traditional absorbing materials, demands for the future developments cannot be realized. The absorbing coating having a thin layer, a simple applying process and good performances is still needed in the art.

SUMMARY

Embodiments of the present disclosure provide a hydrophobic anti-settling far-infrared absorbing material and a method for preparing a hydrophobic anti-settling far-infrared absorbing material, which may be applied in a kitchen appliance product, such as a microwave product, aiming at solving at least one of the problems, such as the absorber is not uniformly dispersed and easy to settle, which will result in a big difference in microwave absorbing properties of the products having the same specification type in the same batch, and even cause a local overheating and melting of the products; a large amount of the resin material such as a silica gel is used, resulting in an excessively thick absorbing layer; the product has no far-infrared performance, and thus the inside of the food is not well-cooked; the production process is complex, time-consuming and costly; the product has no hydrophobic property and oily will be easily adhered after the product is used for a period, existing in the related art.

The hydrophobic anti-settling far-infrared absorbing material includes: 52 to 80 parts by weight of a binder, 0.5 to 2 parts by weight of an absorber, 10 to 20 parts by weight of a far-infrared powder agent, 5 to 10 parts by weight of a solvent, 1 to 15 parts by weight of an anti-settling agent, and 0.8 to 1.5 parts by weight of an adjuvant.

In the present disclosure, the binder is a material having a good bonding property with the absorbing material and the baking tray material, and has a temperature resistance property and thus is not easily decomposed even at a high temperature. The absorber is a material which can be well dispersed in the binder and efficiently absorbs microwave energy in a microwave environment.

Beneficial effects of embodiments of the present disclosure are described below.

The binder with the absorber dispersed therein is attached to the surface of the substrate. The binder has a good bonding property with the absorber and the substrate (for example, the baking tray material), and has a high temperature resistance and is not easily decomposed even at a high temperature, thus meeting the requirements of use in the high temperature environment.

The absorber has a main function of absorbing the microwave energy and converting the energy into heat to the appliance, so as to realize a rapid heat absorption and a good heat transfer performance.

The solvent is used to dissolve the adjuvant and the binder, and has a function of uniformly distributing the absorber and the anti-settling agent.

A far-infrared ray emitted by the far-infrared powder agent has a strong penetrating ability and can penetrate the food to a greater extent.

The anti-settling agent can be well suspended in the coating system, and has a thickening effect, a thixotropic behavior and a chemical stability.

The adjuvant is used to make the components miscible and well-mixed and to well adhere the resulting coating to the substrate.

The inventors have unexpectedly discovered through experiments that by using above components and an appropriate proportion, the prepared hydrophobic anti-settling far-infrared absorbing material may have excellent anti-settling property and uniformity, a good far infrared radiation performance for better cooking result, a high temperature resistance, an excellent absorbing performance, a thin coating layer to be formed, a simple production process and an antibacterial function.

Further, the binder is a hybridized product of a sol and an organic silicon resin. In one embodiment, the mass ratio of the sol to the organic silicon resin is in a range of (3 to 15):1.

Beneficial effects of above embodiment are as follows. By hybridizing the sol and the organic resin, it is beneficial to ensure the high temperature resistance and the easy cleaning performance of the material, that is, the use of the mixture of the sol and the organic resin can achieve good high temperature resistance and easy cleaning performance. Such properties may be further improved when the mass ratio of the sol to the silicone resin is in the range of (3 to 15): 1.

Further, the sol is selected from a silica sol, an aluminum sol, a zirconium sol or mixtures thereof.

Beneficial effects of above embodiment are as follows. By using the above-mentioned kinds of the binders, the absorber may be well dispersed therein and the absorbing material may be well adhered to the surface of the substrate. The binder has good temperature resistance and thus meets the requirements for use in the high temperature environment, and also has good hydrophobic performance.

Further, a content of an effective substance in the silica sol is in a range of 20% to 40%, a content of an effective substance in the aluminum sol is in a range of 20% to 40%, and a content of an effective substance in the zirconium sol is in a range of 15% to 25%.

The effective substance in the silica sol refers to silica, the effective substance in the aluminum sol refers to alumina, and the effective substance in the zirconium sol refers to zirconia. In other words, the mass fraction of silica in the silica sol is from 20% to 40%, the mass fraction of alumina in the aluminum sol is from 20% to 40%, and the mass fraction of zirconia in the zirconium sol is from 15% to 25%.

Beneficial effects of above embodiment are as follows. The appropriate content of the active substance is advantageous for controlling the viscosity of the coating in the stable application. If the content is too low, the viscosity of the coating is small, thus causing poor film-forming properties. If the content is too high, the viscosity is large, thus causing poor flow leveling.

Further, the absorber consists of a component A being acicular zinc oxide whiskers and/or graphite foils, and a component B selected from a lanthanum oxide, a cerium oxide, a neodymium oxide or mixtures thereof.

Beneficial effects of above embodiment are as follows. One or two kinds of the acicular zinc oxide whiskers and graphite foils are added with one or more of the lanthanum oxide, the cerium oxide, the neodymium oxide or the mixtures thereof as the absorbing materials. The absorber may be well dispersed in the binder with an appropriate adjuvant and may absorb the microwave energy efficiently in the microwave environment.

Further, the lanthanum oxide has a grain size of less than 30 nm, the cerium oxide has a grain size of less than 30 nm, and the neodymium oxide has a grain size of less than 30 nm.

Beneficial effects of above embodiment are as follows. Such appropriate parameter ranges are beneficial to the performance of the coating prepared by the material and avoiding the problem of excessive cost. If the grain size is too small, it is not easy for industrial production and may raise a high cost. If the grain size is too large, the coating may have a poor distribution and an unsatisfied appearance.

Further, the solvent is selected from n-butanol, isobutanol, isopropanol or mixtures thereof.

Beneficial effects of above embodiment are as follows. The above-described type of the solvent may be used to facilitate the dissolving of the adjuvant and the binder, thus realizing the effect of uniformly distributing the absorber and the anti-settling agent.

Further, the anti-settling agent is a hydrophobic aerosil.

Beneficial effects of above embodiment are as follows. By using the hydrophobic aerosil as the anti-settling agent, the consistency of the entire coating system and the suspension properties of the fillers may be improved, and the coating may exhibit a thixotropic behavior and thus the settlement of the fillers may be avoided. Therefore, the chemical stability is maintained and the hydrophobic property is increased.

Further, the adjuvant is selected from a dispersant, an antifoaming agent, an adhesion promoter or mixtures thereof.

Beneficial effects of above embodiment are as follows. The components of the coating may be miscible and well mixed, the obtained coating may be well adhered to the substrate, and thus has good coating performances. The main function of the dispersant is to improve the dissolution and dispersion properties of the anti-settling agent and the absorber in the system, so that the whole coating system is uniform and stable. The main function of the antifoaming agent is to reduce the surface tension and thus prevent the foam from forming. The main function of the adhesion promoter is to improve the wetting ability of the coating system and the substrate, thus increasing the adhesion of the coating to the substrate.

Further, the far-infrared powder agent is selected from any two or more of a silicon carbide, an iron oxide, a magnesium oxide, a zinc oxide and an aluminum oxide.

Beneficial effects of above embodiment are as follows. By using above types of the far-infrared powder agent, the ability of penetrating the food is further improved, thus preventing the food from being underdone.

Embodiments of the present disclosure provide a method for preparing a hydrophobic anti-settling far-infrared absorbing material, including: uniformly mixing components in proportion as described above to obtain the hydrophobic anti-settling far-infrared absorbing material.

The mixing process and conditions of the process are not limited in the present disclosure, and appropriate stirring speed and stirring time can be selected according to actual conditions.

Beneficial effects of above embodiment are as follows. The preparation method of the present disclosure is not complex. The prepared hydrophobic anti-settling far-infrared absorbing material has advantages of excellent anti-settling property and uniformity, a high temperature resistance, an excellent absorbing performance, a good far infrared radiation performance for better cooking result, a thin coating layer to be formed, a simple production process and an antibacterial function.

Further, the adjuvant includes a dispersant, an antifoaming agent and an adhesion promoter, and the method for preparing the hydrophobic anti-settling far-infrared absorbing material includes:

1) Preparation of a Dispersant-Binder Mixed System:
uniformly mixing the binder and a part of the dispersant in proportion to prepare the dispersant-binder mixed system;

2) Preparation of an Anti-Settling System:
adding the anti-settling agent and the antifoaming agent in proportion into the mixed system prepared in step 1) and mixing uniformly to prepare the anti-settling system;

3) Preparation of an Anti-Settling Absorbing System:
adding the solvent, the absorber and the adhesion promoter into the anti-settling system prepared in step 2) to prepare the anti-settling absorbing system, in which the solvent is added in portions;

4) Preparation of the Hydrophobic Anti-Settling Far-Infrared Absorbing Material:
adding the far-infrared powder agent and the rest of the dispersant into the anti-settling absorbing system prepared in step 3) and mixing uniformly to prepare the hydrophobic anti-settling far-infrared absorbing material.

Beneficial effects of above embodiment are as follows. The above-mentioned addition order is used for facilitating rapid mixing of the components to avoid poor performance of the resulting material due to uneven mixing.

Further, the ratio of the dispersant, the antifoaming agent and the adhesion promoter is that the mass ratio of the dispersing agent to the antifoaming agent is in a range of (1 to 2):1 and the mass ratio of the antifoaming agent to the adhesion promoter is in a range of (0.5 to 2):1.

Beneficial effects of above embodiment are as follows. The components can be compatible and mixed well, and the obtained coating can be adhered to the substrate. The appropriate ratio of the dispersant, the antifoaming agent and the adhesion promoter will result in better performances of the dispersant, the antifoaming agent and the adhesion promoter.

Embodiments of the present disclosure provide a kitchen appliance product, including a substrate and a coating disposed on a surface of the substrate, in which the coating is made of a hydrophobic anti-settling far-infrared absorbing material as described above.

In one embodiment, depending on actual demands, it is also possible to provide a coating on the kitchen appliance product other than the coating made of the hydrophobic anti-settling far-infrared absorbing material according to embodiments of the present disclosure.

The hydrophobic anti-settling absorbing material of the present disclosure can be used for all kitchen appliances based on microwave performance. For example, it can be used in microwave products such as a microwave oven. The hydrophobic anti-settling absorbing material of the present disclosure may have advantages of excellent anti-settling property and uniformity, a high temperature resistance, an excellent absorbing performance, a good far infrared radiation performance for better cooking result, a thin coating layer to be formed, a simple production process and an antibacterial function.

Embodiments of the present disclosure provide a method for preparing a kitchen appliance product, including spraying a hydrophobic anti-settling far-infrared absorbing material described above on a surface of a substrate of the kitchen appliance product, and performing a curing process to form a coating of the hydrophobic anti-settling far-infrared absorbing material.

Before the spraying, the surface of the substrate of the kitchen appliance product may be pretreated, so as to improve the bonding of the coating and the substrate.

Beneficial effects of above embodiment are as follows. The preparation method of the present disclosure is not complex. The prepared hydrophobic anti-settling far-infrared absorbing material has advantages of excellent anti-settling property and uniformity, a high temperature resistance, an excellent absorbing performance, a good far infrared radiation performance for better cooking result, a thin coating layer to be formed, a simple production process and an antibacterial function.

DETAILED DESCRIPTION

The principles and features of the present disclosure are described below, and the examples are illustrative only and should not be construed to limit the present disclosure.

Unless specified otherwise, the components used in the present disclosure are available commercially or are prepared by conventional techniques in the art.

A hydrophobic anti-settling far-infrared absorbing material includes: 52 to 80 parts by weight of a binder, 0.5 to 2 parts by weight of an absorber, 10 to 20 parts by weight of a far-infrared powder agent, 5 to 10 parts by weight of a solvent, 1 to 15 parts by weight of an anti-settling agent, and 0.8 to 1.5 parts by weight of an adjuvant.

In one embodiment, in the hydrophobic anti-settling far-infrared absorbing material, a mass fraction of the binder is from 52% to 80%, a mass fraction of the absorber is from 0.5% to 2%, a mass fraction of a far-infrared powder agent is from 10% to 20%, a mass fraction of the solvent is from 5% to 10%, a mass fraction of the anti-settling agent is from 1% to 15%, and a mass fraction of the adjuvant is from 0.8% to 1.5%.

The binder is a hybridized product of a sol and an organic silicon resin.

In one embodiment, the mass ratio of the sol to the organic silicon resin is in a range of (3 to 15):1, and the performance of the material is further improved.

The sol is selected from a silica sol, an aluminum sol, a zirconium sol or mixtures thereof.

A content of an effective substance in the silica sol is in a range of 20% to 40%, a content of an effective substance in the aluminum sol is in a range of 20% to 40%, and a content of an effective substance in the zirconium sol is in a range of 15% to 25%.

The effective substance in the silica sol refers to silica, the effective substance in the aluminum sol refers to alumina, and the effective substance in the zirconium sol refers to zirconia. In other words, the mass fraction of silica in the silica sol is from 20% to 40%, the mass fraction of alumina in the aluminum sol is from 20% to 40%, and the mass fraction of zirconia in the zirconium sol is from 15% to 25%.

The term "a hybridized product of a sol and an organic silicon resin" refers to a product obtained after the sol and the organic silicon resin are blended.

The organic silicon resin is a highly crosslinked polysiloxane having a network structure, may be selected from methyl trichlorosilane, dimethyl dichlorosilane, phenyl trichlorosilane, diphenyl dichlorosilane, methylphenyl dichlorosilane or mixtures thereof. The organic silicon resin in the examples was purchased from Wacker Chemie.

The absorber consists of a component A being acicular zinc oxide whiskers and/or graphite foils, and a component B selected from a lanthanum oxide, a cerium oxide, a neodymium oxide or mixtures thereof. In one embodiment, the material may have a better performance when the mass ratio of the component A to the component B is in a range of (3 to 15):1.

In an embodiment of the present disclosure, the lanthanum oxide has a grain size of less than 30 nm, the cerium oxide has a grain size of less than 30 nm, and the neodymium oxide has a grain size of less than 30 nm.

In order to improve the miscible effect, the solvent is selected from n-butanol, isobutanol, isopropanol or mixtures thereof.

The anti-settling agent is a hydrophobic aerosil. In an embodiment of the present disclosure, hydrophobic aerosil R972 and hydrophobic aerosil R974 are purchased from Degussa.

The adjuvant is selected from a dispersant, an antifoaming agent, an adhesion promoter or mixtures thereof. In an embodiment of the present disclosure, the dispersant may be one of sodium lauryl sulfate or cetyl trimethyl ammonium bromide, the antifoaming agent is a product L-1984 from the KUSUMOTO Chemcials. LTD., and the adhesion promoter is one of KH-550 and G-407, both available from Gaezhou Chemical Industry LTD.

The far-infrared powder agent is selected from a silicon carbide, an iron oxide, a magnesium oxide, a zinc oxide, an aluminum oxide or mixtures thereof. When the far-infrared powder agent is selected from any two or more of a silicon carbide, an iron oxide, a magnesium oxide, a zinc oxide and an aluminum oxide, the far infrared radiation performance may be improved, thus achieving a better cooking result.

In an embodiment of the present disclosure, grain sizes of the silicon carbide, the iron oxide, the magnesium oxide, the zinc oxide and the aluminum oxide are below 50 nm.

A method for preparing a hydrophobic anti-settling far-infrared absorbing material includes: uniformly mixing components in proportion described above to obtain the hydrophobic anti-settling far-infrared absorbing material.

When the adjuvant includes a dispersant, an antifoaming agent and an adhesion promoter, the method for preparing the hydrophobic anti-settling far-infrared absorbing material includes:

1) Preparation of a Dispersant-Binder Mixed System:
uniformly mixing the binder and a part of the dispersant in proportion to prepare the dispersant-binder mixed system;

2) Preparation of an Anti-Settling System:
adding the anti-settling agent and the antifoaming agent in proportion into the mixed system prepared in step 1) and mixing uniformly to prepare the anti-settling system;

3) Preparation of an Anti-Settling Absorbing System:
adding the solvent, the absorber and the adhesion promoter into the anti-settling system prepared in step 2) to prepare the anti-settling absorbing system, in which the solvent is added in portions;

4) Preparation of the Hydrophobic Anti-Settling Far-Infrared Absorbing Material:
adding the far-infrared powder agent and the rest of the dispersant into the anti-settling absorbing system prepared in step 3) and mixing uniformly to prepare the hydrophobic anti-settling far-infrared absorbing material.

In one embodiment, following steps may be performed.

1) Preparation of the Dispersant-Binder Mixed System

The binder and a part of the dispersant are mixed in proportion under mechanical stirring until the dispersant is dissolved completely and the system is uniform, and thus the dispersant-binder mixed system is prepared.

2) Preparation of the Anti-Settling System

The anti-settling agent and the antifoaming agent in proportion are added into the mixed system prepared in step 1), a mechanical stirring speed is adjusted for mixing the components uniformly, and thus the anti-settling system is prepared.

3) Preparation of the Anti-Settling Absorbing System

The solvent, the absorber and the adhesion promoter are added into the anti-settling system prepared in step 2). In one embodiment, the solvent is added in portions. Thus, the anti-settling absorbing system is prepared.

4) Preparation of the Hydrophobic Anti-Settling Far-Infrared Absorbing Material

The far-infrared powder agent and the rest of the dispersant are added into the anti-settling absorbing system prepared in step 3) and mixed uniformly under mechanical stirring, and thus the hydrophobic anti-settling far-infrared absorbing material is prepared.

The dispersant is added separately to improve the compatibility of the components. The solvent is added in different batches for facilitating the uniform mixing of the components.

In one embodiment, the mass ratio of the dispersant added in step 4) to the entire dispersant is 1:2.

The ratio of the dispersant, the antifoaming agent and the adhesion promoter is that the mass ratio of the dispersing agent to the antifoaming agent is in a range of (1 to 2):1 and the mass ratio of the antifoaming agent to the adhesion promoter is in a range of (0.5 to 2):1, thus improving the performances of the material A kitchen appliance product includes a substrate and a coating disposed on a surface of the substrate, and the coating is made of a hydrophobic anti-settling far-infrared absorbing material described above.

A method for preparing a kitchen appliance product includes: spraying a hydrophobic anti-settling far-infrared absorbing material described above on a surface of a substrate of the kitchen appliance product, and performing a curing process to form a coating of the hydrophobic anti-settling far-infrared absorbing material. A drying process may be performed during the curing process.

Specific examples are used for describing the present disclosure as follow.

EXAMPLE 1

A hydrophobic anti-settling far-infrared absorbing material and a method for preparing such a material are provided. The material includes 64.8 kg of a binder, 2 kg of an absorber, 7 kg of a solvent, 15 kg of a far-infrared powder agent, 10 kg of an anti-settling agent, and 1.2 kg of an adjuvant.

The method for preparing the material is as follows.

1) Preparation of the Dispersant-Binder Mixed System 64.8 kg of the binder (consisting of 25 kg of silica sol, 17 kg of aluminum sol, 10 kg of zirconium sol and 12.8 kg of organic silicon resin) and 0.3 kg of sodium lauryl sulfate used as the dispersant were mixed in proportion under mechanical stirring at a speed of 500 r/min until the dispersant was dissolved completely and the system was uniform, and thus the dispersant-binder mixed system was prepared.

2) Preparation of the Anti-Settling System 10 kg of hydrophobic aerosil R974 and 0.3 kg of the antifoaming agent L-1984 were added into the dispersant-binder mixed system prepared in step 1). After mechanical stirring was performed at a speed of 100 r/min for 5 min, mechanical stirring was performed at a speed of 600 r/min for another 10 min to mix the components uniformly, and thus the anti-settling system was prepared.

3) Preparation of the Anti-Settling Absorbing System 7 kg of the solvent (consisting of 5 kg of isopropanol and 2 kg of isobutanol), 2 kg of the absorber (consisting of 1.2 kg of acicular zinc oxide whiskers, 0.6 kg of graphite foils, 0.1 kg of lanthanum oxide, 0.05 kg of cerium oxide, 0.05 kg of neodymium oxide) and 0.3 kg of the adhesion promoter G-407 were added into the anti-settling system prepared in step 2). The solvent was added in portions under mechanical stirring at a speed of 300 r/min for 10 min. Thus, the anti-settling absorbing system was prepared.

4) Preparation of the Hydrophobic Anti-Settling Far-Infrared Absorbing Material 15 kg of the far-infrared powder agent (consisting of 7 kg of silicon carbide, 4 kg of zinc oxide, 2 kg of magnesium oxide and 2 kg of iron oxide) and 0.3 kg of sodium lauryl sulfate as the dispersant were added into the anti-settling absorbing system prepared in step 3) and mixed uniformly under mechanical stirring, and thus a final product i.e., the hydrophobic anti-settling far-infrared absorbing material, was prepared.

In the above components, a content of an effective substance in the silica sol is 20%, a content of an effective substance in the aluminum sol is 20%, and a content of an effective substance in the zirconium sol is 15%.

EXAMPLE 2

A hydrophobic anti-settling far-infrared absorbing material and a method for preparing such a material are provided. The material includes 59.1 kg of a binder, 1.6 kg of an absorber, 9 kg of a solvent, 18 kg of a far-infrared powder agent, 11 kg of an anti-settling agent, and 1.3 kg of an adjuvant.

The method for preparing the material is as follows.

1) Preparation of the Dispersant-Binder Mixed System 59.1 kg of the binder (consisting of 15 kg of silica sol, 15 kg of aluminum sol, 15 kg of zirconium sol and 14.1 kg of organic silicon resin) and 0.3 kg of cetyl trimethyl ammonium bromide used as the dispersant were mixed in proportion under mechanical stirring at a speed of 500 r/min until the dispersant was dissolved completely and the system was uniform, and thus the dispersant-binder mixed system was prepared.

2) Preparation of the Anti-Settling System 11 kg of hydrophobic aerosil R972 and 0.3 kg of the antifoaming agent L-1984 were added into the dispersant-binder mixed system prepared in step 1). After mechanical stirring was performed at a speed of 100 r/min for 5 min, mechanical stirring was performed at a speed of 600 r/min for another 10 min to mix the components uniformly, and thus the anti-settling system was prepared.

3) Preparation of the Anti-Settling Absorbing System 9 kg of the solvent (consisting of 5 kg of isopropanol and 4 kg of n-butanol), 1.6 kg of the absorber (consisting of 1.0 kg of acicular zinc oxide whiskers, 0.5 kg of graphite foils, 0.05 kg of lanthanum oxide and 0.05 kg of cerium oxide) and 0.4 kg of the adhesion promoter KH-550 were added into the anti-settling system prepared in step 2). The solvent was added in portions under mechanical stirring at a speed of 300 r/min for 10 min. Thus, the anti-settling absorbing system was prepared.

4) Preparation of the Hydrophobic Anti-Settling Far-Infrared Absorbing Material 18 kg of the far-infrared powder agent (consisting of 5 kg of silicon carbide, 4 kg of aluminum oxide, 3 kg of zinc oxide, and 6 kg of iron oxide) and 0.3 kg of cetyl trimethyl ammonium bromide as the dispersant were added into the anti-settling absorbing system prepared in step 3) and mixed uniformly under mechanical stirring, and thus a final product i.e., the hydrophobic anti-settling far-infrared absorbing material, was prepared.

In the above components, a content of an effective substance in the silica sol is 40%, a content of an effective substance in the aluminum sol is 40%, and a content of an effective substance in the zirconium sol is 25%.

EXAMPLE 3

A hydrophobic anti-settling far-infrared absorbing material and a method for preparing such a material are provided. The material includes 54.3 kg of a binder, 1.2 kg of an absorber, 10 kg of a solvent, 20 kg of a far-infrared powder agent, 13 kg of an anti-settling agent, and 1.5 kg of an adjuvant.

The method for preparing the material is as follows.

1) Preparation of the Dispersant-Binder Mixed System 54.3 kg of the binder (consisting of 28 kg of silica sol, 20 kg of aluminum sol, and 6.3 kg of organic silicon resin) and 0.4 kg of cetyl trimethyl ammonium bromide used as the dispersant were mixed in proportion under mechanical stirring at a speed of 500 r/min until the dispersant was dissolved completely and the system was uniform, and thus the dispersant-binder mixed system was prepared.

2) Preparation of the Anti-Settling System 13 kg of hydrophobic aerosil R972 and 0.3 kg of the antifoaming agent L-1984 were added into the dispersant-binder mixed system prepared in step 1). After mechanical stirring was performed at a speed of 100 r/min for 5 min, mechanical stirring was performed at a speed of 600 r/min for another 10 min to mix the components uniformly, and thus the anti-settling system was prepared.

3) Preparation of the Anti-Settling Absorbing System 10 kg of the solvent (consisting of 6 kg isopropanol of, 2 kg of n-butanol and 2 kg of isobutanol), 1.2 kg of the absorber (consisting of 0.6 kg of acicular zinc oxide whiskers, 0.5 kg of graphite foils and 0.1 kg of lanthanum oxide) and 0.4 kg of the adhesion promoter G-407 were added into the anti-settling system prepared in step 2). The solvent was added in portions under mechanical stirring at a speed of 300 r/min for 10 min. Thus, the anti-settling absorbing system was prepared.

4) Preparation of the Hydrophobic Anti-Settling Far-Infrared Absorbing Material 20 kg of the far-infrared powder agent (consisting of 4 kg of silicon carbide, 4 kg of aluminum oxide, 4 kg of zinc oxide, 4 kg of magnesium oxide and 4 kg of iron oxide) and 4 kg of cetyl trimethyl ammonium bromide as the dispersant were added into the anti-settling absorbing system prepared in step 3) and mixed uniformly under mechanical stirring, and thus a final product i.e., the hydrophobic anti-settling far-infrared absorbing material, was prepared.

In the above components, a content of an effective substance in the silica sol is 30% and a content of an effective substance in the aluminum sol is 30%.

EXAMPLE 4

A hydrophobic anti-settling far-infrared absorbing material and a method for preparing such a material are provided. The material includes 70.2 kg of a binder, 0.8 kg of an absorber, 10 kg of a solvent, 12 kg of a far-infrared powder agent, 6 kg of an anti-settling agent, and 1.0 kg of an adjuvant.

The method for preparing the material is as follows.

1) Preparation of the Dispersant-Binder Mixed System 70.2 kg of the binder (consisting of 39 kg of silica sol, 10 kg of aluminum sol, and 12.2 kg of organic silicon resin) and 0.3 kg of sodium lauryl sulfate used as the dispersant were mixed in proportion under mechanical stirring at a speed of 500 r/min until the dispersant was dissolved completely and the system was uniform, and thus the dispersant-binder mixed system was prepared.

2) Preparation of the Anti-Settling System 6 kg of hydrophobic aerosil R974 and 0.2 kg of the antifoaming agent L-1984 were added into the dispersant-binder mixed system prepared in step 1). After mechanical stirring was performed at a speed of 100 r/min for 5 min, mechanical stirring was performed at a speed of 600 r/min for another 10 min to mix the components uniformly, and thus the anti-settling system was prepared.

3) Preparation of the Anti-Settling Absorbing System 10 kg of the solvent (consisting of 3 kg of n-butanol and 7 kg of isobutanol), 0.8 kg of the absorber (consisting of 0.6 kg of graphite foils, 0.1 kg of lanthanum oxide and 0.1 kg of cerium oxide) and 0.2 kg of the adhesion promoter G-407 were added into the anti-settling system prepared in step 2). The solvent was added in portions under mechanical stirring at a speed of 300 r/min for 10 min. Thus, the anti-settling absorbing system was prepared.

4) Preparation of the Hydrophobic Anti-Settling Far-Infrared Absorbing Material 12 kg of the far-infrared powder agent (consisting of 3 kg of zinc oxide, 3 kg of magnesium oxide and 6 kg of iron oxide) and 0.3 kg of sodium lauryl sulfate as the dispersant were added into the anti-settling absorbing system prepared in step 3) and mixed uniformly under mechanical stirring, and thus a final product i.e., the hydrophobic anti-settling far-infrared absorbing material, was prepared.

In the above components, a content of an effective substance in the silica sol is 30%, a content of an effective substance in the aluminum sol is 30%, and a content of an effective substance in the zirconium sol is 20%.

EXAMPLE 5

A hydrophobic anti-settling far-infrared absorbing material and a method for preparing such a material are provided. The material includes 75.7 kg of a binder, 0.5 kg of an absorber, 9 kg of a solvent, 10 kg of a far-infrared powder agent, 4 kg of an anti-settling agent, and 0.8 kg of an adjuvant.

The method for preparing the material is as follows.

1) Preparation of the Dispersant-Binder Mixed System 75.7 kg of the binder (consisting of 20 kg of silica sol, 47 kg of aluminum sol and 8.7 kg of organic silicon resin) and 0.2 kg of sodium lauryl sulfate used as the dispersant were mixed in proportion under mechanical stirring at a speed of 500 r/min until the dispersant was dissolved completely and the system was uniform, and thus the dispersant-binder mixed system was prepared.

2) Preparation of the Anti-Settling System 4 kg of hydrophobic aerosil R974 and 0.2 kg of the antifoaming agent L-1984 were added into the dispersant-binder mixed system prepared in step 1). After mechanical stirring was performed at a speed of 100 r/min for 5 min, mechanical stirring was performed at a speed of 600 r/min for another 10 min to mix the components uniformly, and thus the anti-settling system was prepared.

3) Preparation of the Anti-Settling Absorbing System 9 kg of the solvent (isopropanol), 0.5 kg of the absorber (consisting of 0.2 kg of acicular zinc oxide whiskers, 0.25 kg of graphite foils, and 0.05 kg of cerium oxide) and 0.2 kg of the adhesion promoter G-407 were added into the anti-settling system prepared in step 2). The solvent was added in portions under mechanical stirring at a speed of 300 r/min for 10 min. Thus, the anti-settling absorbing system was prepared.

4) Preparation of the Hydrophobic Anti-Settling Far-Infrared Absorbing Material 10 kg of the far-infrared powder agent (consisting of 4 kg of silicon carbide, 1 kg of magnesium oxide, 4 kg of iron oxide and 1 kg of zinc oxide) and 0.2 kg of sodium lauryl sulfate as the dispersant were added into the anti-settling absorbing system prepared in step 3) and mixed uniformly under mechanical stirring, and thus a final product i.e., the hydrophobic anti-settling far-infrared absorbing material, was prepared.

In the above components, a content of an effective substance in the silica sol is 30% and a content of an effective substance in the aluminum sol is 30%.

EXAMPLE 6

A hydrophobic anti-settling far-infrared absorbing material and a method for preparing such a material are provided. The material includes 79.7 kg of a binder, 0.5 kg of an absorber, 5 kg of a solvent, 10 kg of a far-infrared powder agent, 4 kg of an anti-settling agent, and 0.8 kg of an adjuvant.

The method for preparing the material is as follows.

1) Preparation of the Dispersant-Binder Mixed System 79.7 kg of the binder (consisting of 35 kg of silica sol, 35 kg of aluminum sol, 4.7 kg of zirconium sol and 5 kg of organic silicon resin) and 0.2 kg of cetyl trimethyl ammonium bromide used as the dispersant were mixed in proportion under mechanical stirring at a speed of 500 r/min until the dispersant was dissolved completely and the system was uniform, and thus the dispersant-binder mixed system was prepared.

2) Preparation of the Anti-Settling System 4 kg of hydrophobic aerosil R972 and 0.2 kg of the antifoaming agent L-1984 were added into the dispersant-binder mixed system prepared in step 1). After mechanical stirring was performed at a speed of 100 r/min for 5 min, mechanical stirring was performed at a speed of 600 r/min for another 10 min to mix the components uniformly, and thus the anti-settling system was prepared.

3) Preparation of the Anti-Settling Absorbing System 5 kg of the solvent (consisting of 2 kg of isopropanol and 3 kg of isobutanol), 0.5 kg of the absorber (consisting of 0.2 kg of acicular zinc oxide whiskers, 0.25 kg of graphite foils, and 0.05 kg of cerium oxide) and 0.2 kg of the adhesion promoter KH-550 were added into the anti-settling system prepared in step 2). The solvent was added in portions under mechanical stirring at a speed of 300 r/min for 10 min. Thus, the anti-settling absorbing system was prepared.

4) Preparation of the Hydrophobic Anti-Settling Far-Infrared Absorbing Material 10 kg of the far-infrared powder agent (consisting of 4 kg of silicon carbide, 1 kg of magnesium oxide, 4 kg of iron oxide and 1 kg of zinc oxide) and 0.2 kg of cetyl trimethyl ammonium bromide as the dispersant were added into the anti-settling absorbing system prepared in step 3) and mixed uniformly under mechanical stirring, and thus a final product i.e., the hydrophobic anti-settling far-infrared absorbing material, was prepared.

In the above components, a content of an effective substance in the silica sol is 30%, a content of an effective substance in the aluminum sol is 30%, and a content of an effective substance in the zirconium sol is 20%.

EXAMPLE 7

A hydrophobic anti-settling far-infrared absorbing material and a method for preparing such a material are provided. The material includes 64.3 kg of a binder, 0.5 kg of an absorber, 9 kg of a solvent, 10 kg of a far-infrared powder agent, 15 kg of an anti-settling agent, and 1.2 kg of an adjuvant.

The method for preparing the material is as follows.

1) Preparation of the Dispersant-Binder Mixed System 64.3 kg of the binder (consisting of 22 kg of silica sol, 13 kg of aluminum sol, 22 kg of zirconium sol and 7.3 kg of organic silicon resin) and 0.3 kg of cetyl trimethyl ammonium bromide used as the dispersant were mixed in proportion under mechanical stirring at a speed of 500 r/min until the dispersant was dissolved completely and the system was uniform, and thus the dispersant-binder mixed system was prepared.

2) Preparation of the Anti-Settling System 15 kg of hydrophobic aerosil R972 and 0.3 kg of the antifoaming agent L-1984 were added into the dispersant-binder mixed system prepared in step 1). After mechanical stirring was performed at a speed of 100 r/min for 5 min, mechanical stirring was performed at a speed of 600 r/min for another 10 min to mix the components uniformly, and thus the anti-settling system was prepared.

3) Preparation of the Anti-Settling Absorbing System 9 kg of the solvent (consisting of 5 kg of isopropanol, 3 kg of isobutanol and 1 kg of n-butanol), 0.5 kg of the absorber (consisting of 0.2 kg of acicular zinc oxide whiskers, 0.25 kg of graphite foils and 0.05 kg of cerium oxide) and 0.3 kg of the adhesion promoter KH-550 were added into the anti-settling system prepared in step 2). The solvent was added in portions under mechanical stirring at a speed of 300 r/min for 10 min. Thus, the anti-settling absorbing system was prepared.

4) Preparation of the Hydrophobic Anti-Settling Far-Infrared Absorbing Material 10 kg of the far-infrared powder agent (consisting of 4 kg of silicon carbide, 1 kg of magnesium oxide, 4 kg of iron oxide and 1 kg of zinc oxide) and 0.3 kg of cetyl trimethyl ammonium bromide as the dispersant were added into the anti-settling absorbing system prepared in step 3) and mixed uniformly under mechanical stirring, and thus a final product i.e., the hydrophobic anti-settling far-infrared absorbing material, was prepared.

In the above components, a content of an effective substance in the silica sol is 30%, a content of an effective substance in the aluminum sol is 30%, and a content of an effective substance in the zirconium sol is 20%.

EXAMPLE 8

A hydrophobic anti-settling far-infrared absorbing material and a method for preparing such a material are provided. The material includes 79.7 kg of a binder, 0.5 kg of an absorber, 8 kg of a solvent, 10 kg of a far-infrared powder agent, 1 kg of an anti-settling agent, and 0.8 kg of an adjuvant.

The method for preparing the material is as follows.

1) Preparation of the Dispersant-Binder Mixed System 79.7 kg of the binder (consisting of 35 kg of silica sol, 30 kg of aluminum sol, 7 kg of zirconium sol and 7.7 kg of organic silicon resin) and 0.2 kg of cetyl trimethyl ammonium bromide used as the dispersant were mixed in proportion under mechanical stirring at a speed of 500 r/min until the dispersant was dissolved completely and the system was uniform, and thus the dispersant-binder mixed system was prepared.

2) Preparation of the Anti-Settling System 1 kg of hydrophobic aerosil R972 and 0.2 kg of the antifoaming agent L-1984 were added into the dispersant-binder mixed system prepared in step 1). After mechanical stirring was performed at a speed of 100 r/min for 5 min, mechanical stirring was performed at a speed of 600 r/min for another 10 min to mix the components uniformly, and thus the anti-settling system was prepared.

3) Preparation of the Anti-Settling Absorbing System 8 kg of the solvent (consisting of 5 kg of isopropanol and 3 kg of isobutanol), 0.5 kg of the absorber (consisting of 0.2 kg of acicular zinc oxide whiskers, 0.25 kg of graphite foils and 0.05 kg of cerium oxide) and 0.2 kg of the adhesion promoter KH-550 were added into the anti-settling system prepared in step 2). The solvent was added in portions under mechanical stirring at a speed of 300 r/min for 10 min. Thus, the anti-settling absorbing system was prepared.

4) Preparation of the Hydrophobic Anti-Settling Far-Infrared Absorbing Material 10 kg of the far-infrared powder agent (consisting of 4 kg of silicon carbide, 1 kg of magnesium oxide, 4 kg of iron oxide and 1 kg of zinc oxide) and 0.2 kg of cetyl trimethyl ammonium bromide as the dispersant were added into the anti-settling absorbing system prepared in step 3) and mixed uniformly under mechanical stirring, and thus a final product i.e., the hydrophobic anti-settling far-infrared absorbing material, was prepared.

In the above components, a content of an effective substance in the silica sol is 30%, a content of an effective substance in the aluminum sol is 30%, and a content of an effective substance in the zirconium sol is 20%.

EXAMPLE 9

A hydrophobic anti-settling far-infrared absorbing material and a method for preparing such a material are provided. The material includes 52 kg of a binder, 2 kg of an absorber, 9.5 kg of a solvent, 20 kg of a far-infrared powder agent, 15 kg of an anti-settling agent, and 1.5 kg of an adjuvant.

The method for preparing the material is as follows.

1) Preparation of the Dispersant-Binder Mixed System 52 kg of the binder (consisting of 45 kg of silica sol and 7 kg of organic silicon resin) and 0.4 kg of sodium lauryl sulfate used as the dispersant were mixed in proportion under mechanical stirring at a speed of 500 r/min until the dispersant was dissolved completely and the system was uniform, and thus the dispersant-binder mixed system was prepared.

2) Preparation of the Anti-Settling System 15 kg of hydrophobic aerosil R974 and 0.4 kg of the antifoaming agent L-1984 were added into the dispersant-binder mixed system prepared in step 1). After mechanical stirring was performed at a speed of 100 r/min for 5 min, mechanical stirring was performed at a speed of 600 r/min for another 10 min to mix the components uniformly, and thus the anti-settling system was prepared.

3) Preparation of the Anti-Settling Absorbing System 9.5 kg of the solvent (n-butanol), 2 kg of the absorber (consisting of 1.8 kg of graphite foils and 0.2 kg of cerium oxide) and 0.3 kg of the adhesion promoter G-407 were added into the anti-settling system prepared in step 2). The solvent was added in portions under mechanical stirring at a speed of 300 r/min for 10 min. Thus, the anti-settling absorbing system was prepared.

4) Preparation of the Hydrophobic Anti-Settling Far-Infrared Absorbing Material 20 kg of the far-infrared powder agent (consisting of 5 kg of silicon carbide, 5 kg of zinc oxide, 5 kg of magnesium oxide and 5 kg of iron oxide) and 0.4 kg of sodium lauryl sulfate as the dispersant were added into the anti-settling absorbing system prepared in step 3) and mixed uniformly under mechanical stirring, and thus a final product i.e., the hydrophobic anti-settling far-infrared absorbing material, was prepared.

In the above components, a content of an effective substance in the silica sol is 30%.

EXAMPLE 10

On the basis of Example 6, the silica sol was adjusted to 35.3 kg, the hydrophobic aerosil R972 was adjusted to 3.7 kg, and others are the same as those of Example 6.

COMPARATIVE EXAMPLE 1

A hydrophobic anti-settling far-infrared absorbing material and a method for preparing such a material are provided. The material includes 85.3 kg of a binder, 0.2 kg of an absorber, 7 kg of a solvent, 6 kg of a far-infrared powder agent, 0.3 kg of an anti-settling agent, and 1.2 kg of an adjuvant.

The method for preparing the material is as follows.

1) Preparation of the Dispersant-Binder Mixed System 85.3 kg of the binder (consisting of 25 kg of silica sol, 17 kg of aluminum sol, 31 kg of zirconium sol and 12.3 kg of organic silicon resin) and 0.3 kg of sodium lauryl sulfate used as the dispersant were mixed in proportion under mechanical stirring at a speed of 500 r/min until the dispersant was dissolved completely and the system was uniform, and thus the dispersant-binder mixed system was prepared.

2) Preparation of the Anti-Settling System 0.3 kg of hydrophobic aerosil R974 and 0.3 kg of the antifoaming agent L-1984 were added into the dispersant-binder mixed system prepared in step 1). After mechanical stirring was performed at a speed of 100 r/min for 5 min, mechanical stirring was performed at a speed of 600 r/min for another 10 min to mix the components uniformly, and thus the anti-settling system was prepared.

3) Preparation of the Anti-Settling Absorbing System 7 kg of the solvent (consisting of 5 kg of isopropanol and 2 kg of isobutanol), 0.2 kg of the absorber (consisting of 0.12 kg of acicular zinc oxide whiskers, 0.06 kg of graphite foils, 0.01 kg of lanthanum oxide, 0.005 kg of cerium oxide, 0.005 kg of neodymium oxide) and 0.3 kg of the adhesion promoter G-407 were added into the anti-settling system prepared in step 2). The solvent was added in portions under mechanical stirring at a speed of 300 r/min for 10 min. Thus, the anti-settling absorbing system was prepared.

4) Preparation of the Hydrophobic Anti-Settling Far-Infrared Absorbing Material 6 kg of the far-infrared powder agent (consisting of 1 kg of silicon carbide, 1 kg of zinc oxide, 2 kg of magnesium oxide and 2 kg of iron oxide) and 0.3 kg of sodium lauryl sulfate as the dispersant were added into the anti-settling absorbing system prepared in step 3) and mixed uniformly under mechanical stirring, and thus a final product i.e., the hydrophobic anti-settling far-infrared absorbing material, was prepared.

In the above components, a content of an effective substance in the silica sol is 30%, a content of an effective substance in the aluminum sol is 30%, and a content of an effective substance in the zirconium sol is 20%.

COMPARATIVE EXAMPLE 2

A hydrophobic anti-settling far-infrared absorbing material and a method for preparing such a material are provided. The material includes 83.1 kg of a binder, 0.2 kg of an absorber, 7 kg of a solvent, 8 kg of a far-infrared powder agent, 0.5 kg of an anti-settling agent, and 1.2 kg of an adjuvant.

The method for preparing the material is as follows.

1) Preparation of the Dispersant-Binder Mixed System 83.1 kg of the binder (consisting of 25 kg of silica sol, 14 kg of aluminum sol, 31 kg of zirconium sol and 13.1 kg of organic silicon resin) and 0.3 kg of sodium lauryl sulfate used as the dispersant were mixed in proportion under mechanical stirring at a speed of 500 r/min until the dispersant was dissolved completely and the system was uniform, and thus the dispersant-binder mixed system was prepared.

2) Preparation of the Anti-Settling System 0.5 kg of hydrophobic aerosil R974 and 0.3 kg of the antifoaming agent L-1984 were added into the dispersant-binder mixed system prepared in step 1). After mechanical stirring was performed at a speed of 100 r/min for 5 min, mechanical stirring was performed at a speed of 600 r/min for another 10 min to mix the components uniformly, and thus the anti-settling system was prepared.

3) Preparation of the Anti-Settling Absorbing System 7 kg of the solvent (consisting of 5 kg of isopropanol and 2 kg of isobutanol), 0.2 kg of the absorber (consisting of 0.12 kg of acicular zinc oxide whiskers, 0.06 kg of graphite foils, 0.01 kg of lanthanum oxide, 0.005 kg of cerium oxide, 0.005 kg of neodymium oxide) and 0.3 kg of the adhesion promoter G-407 were added into the anti-settling system prepared in step 2). The solvent was added in portions under mechanical stirring at a speed of 300 r/min for 10 min. Thus, the anti-settling absorbing system was prepared.

4) Preparation of the Hydrophobic Anti-Settling Far-Infrared Absorbing Material 8 kg of the far-infrared powder agent (consisting of 3 kg of silicon carbide, 1 kg of zinc oxide, 2 kg of magnesium oxide and 2 kg of iron oxide) and 0.3 kg of sodium lauryl sulfate as the dispersant were added into the anti-settling absorbing system prepared in step 3) and mixed uniformly under mechanical stirring, and thus a final product i.e., the hydrophobic anti-settling far-infrared absorbing material, was prepared.

In the above components, a content of an effective substance in the silica sol is 30%, a content of an effective substance in the aluminum sol is 30%, and a content of an effective substance in the zirconium sol is 20%.

COMPARATIVE EXAMPLE 3

A hydrophobic anti-settling far-infrared absorbing material and a method for preparing such a material are provided. The material includes 50 kg of a binder, 2.2 kg of an absorber, 7 kg of a solvent, 22 kg of a far-infrared powder agent, 17.6 kg of an anti-settling agent, and 1.2 kg of an adjuvant.

The method for preparing the material is as follows.

1) Preparation of the Dispersant-Binder Mixed System 50 kg of the binder (consisting of 25 kg of silica sol, 14 kg of aluminum sol, 1 kg of zirconium sol and 10 kg of organic silicon resin) and 0.3 kg of sodium lauryl sulfate used as the dispersant were mixed in proportion under mechanical stirring at a speed of 500 r/min until the dispersant was dissolved completely and the system was uniform, and thus the dispersant-binder mixed system was prepared.

2) Preparation of the Anti-Settling System 17.6 kg of hydrophobic aerosil R974 and 0.3 kg of the antifoaming agent L-1984 were added into the dispersant-binder mixed system prepared in step 1). After mechanical stirring was performed at a speed of 100 r/min for 5 min, mechanical stirring was performed at a speed of 600 r/min for another 10 min to mix the components uniformly, and thus the anti-settling system was prepared.

3) Preparation of the Anti-Settling Absorbing System 7 kg of the solvent (consisting of 5 kg of isopropanol and 2 kg of isobutanol), 2.2 kg of the absorber (consisting of 1.4 kg of acicular zinc oxide whiskers, 0.6 kg of graphite foils, 0.1 kg of lanthanum oxide, 0.05 kg of cerium oxide, 0.05 kg of neodymium oxide) and 0.3 kg of the adhesion promoter G-407 were added into the anti-settling system prepared in step 2). The solvent was added in portions under mechanical stirring at a speed of 300 r/min for 10 min. Thus, the anti-settling absorbing system was prepared.

4) Preparation of the Hydrophobic Anti-Settling Far-Infrared Absorbing Material 22 kg of the far-infrared powder agent (consisting of 13 kg of silicon carbide, 5 kg of zinc oxide, 2 kg of magnesium oxide and 2 kg of iron oxide) and 0.3 kg of sodium lauryl sulfate as the dispersant were added into the anti-settling absorbing system prepared in step 3) and mixed uniformly under mechanical stirring, and thus a final product i.e., the hydrophobic anti-settling far-infrared absorbing material, was prepared.

In the above components, a content of an effective substance in the silica sol is 30%, a content of an effective substance in the aluminum sol is 30%, and a content of an effective substance in the zirconium sol is 20%.

COMPARATIVE EXAMPLE 4

A hydrophobic anti-settling far-infrared absorbing material and a method for preparing such a material are provided. The material includes 45.3 kg of a binder, 2.5 kg of an absorber, 7 kg of a solvent, 24 kg of a far-infrared powder agent, 20 kg of an anti-settling agent, and 1.2 kg of an adjuvant.

The method for preparing the material is as follows.

1) Preparation of the Dispersant-Binder Mixed System 45.3 kg of the binder (consisting of 25 kg of silica sol, 4 kg of aluminum sol, 6 kg of zirconium sol and 10.3 kg of organic silicon resin) and 0.3 kg of sodium lauryl sulfate used as the dispersant were mixed in proportion under mechanical stirring at a speed of 500 r/min until the dispersant was dissolved completely and the system was uniform, and thus the dispersant-binder mixed system was prepared.

2) Preparation of the Anti-Settling System 20 kg of hydrophobic aerosil R974 and 0.3 kg of the antifoaming agent L-1984 were added into the dispersant-binder mixed system prepared in step 1). After mechanical stirring was performed at a speed of 100 r/min for 5 min, mechanical stirring was performed at a speed of 600 r/min for another 10 min to mix the components uniformly, and thus the anti-settling system was prepared.

3) Preparation of the Anti-Settling Absorbing System 7 kg of the solvent (consisting of 5 kg of isopropanol and 2 kg of isobutanol), 2.5 kg of the absorber (consisting of 1.7 kg of acicular zinc oxide whiskers, 0.6 kg of graphite foils, 0.1 kg of lanthanum oxide, 0.05 kg of cerium oxide, 0.05 kg of neodymium oxide) and 0.3 kg of the adhesion promoter G-407 were added into the anti-settling system prepared in step 2). The solvent was added in portions under mechanical stirring at a speed of 300 r/min for 10 min. Thus, the anti-settling absorbing system was prepared.

4) Preparation of the Hydrophobic Anti-Settling Far-Infrared Absorbing Material 24 kg of the far-infrared powder agent (consisting of 15 kg of silicon carbide, 5 kg of zinc oxide, 2 kg of magnesium oxide and 2 kg of iron oxide) and 0.3 kg of sodium lauryl sulfate as the dispersant were added into the anti-settling absorbing system prepared in step 3) and mixed uniformly under mechanical stirring, and thus a final product i.e., the hydrophobic anti-settling far-infrared absorbing material, was prepared.

In the above components, a content of an effective substance in the silica sol is 30%, a content of an effective substance in the aluminum sol is 30%, and a content of an effective substance in the zirconium sol is 20%.

The hydrophobic anti-settling far-infrared absorbing materials prepared in above Examples and Comparative Examples were sprayed on a surface of a substrate of a baking tray respectively. After drying, coatings of the hydrophobic anti-settling far-infrared absorbing materials were formed, and used for following tests.

Test Data

1. Microwave performance is characterized by a highest temperature of a prepared baking tray. For different examples, same heating time (2 min) is used, materials and sizes of the baking trays are the same, and a same microwave oven with 100% power is used. The experimental results are shown in Table 1.

The coating of each baking tray prepared in Examples 1 to 9 has a thickness of 50 μm.

The coating of each baking tray prepared in Comparative Examples 1 to 4 has a thickness of 50 μm.

The existing resin absorbing material has a thickness of 2 mm.

2. Water Contact Angle Test

Water contact angle of each of the Examples and the Comparative Examples is measured by a water contact angle tester. The experimental results are shown in Table 1.

The contact angle refers to an angle θ at an intersection of gas, liquid and solid phases and between a tangential line of the gas-liquid interface and a solid-liquid boundary line, which is a measure of a degree of wetting. If θ<90°, the solid surface is hydrophilic, that is, the liquid is relatively easy to wet the solid, and the smaller the contact angle is, the better the hydrophilic property is. If θ>90°, the solid surface is hydrophobic, that is, the liquid does not easily wet the solid and easily moves on the surface.

3. Settling and thixotropic properties of the coating: a same amount of each coating is placed in a same beaker for 48 hours, and observed whether sedimentation happens to the coating. The coating is then under mechanical stirring at a speed of 200 r/min to observe whether the coating has a shear thinning performance. If no sedimentation occurs and the coating has a thixotropic property, the result is recorded as excellent. If no sedimentation occurs and the coating has no thixotropic property, the result is recorded as good. If the sedimentation occurs, the result is recorded as bad. The experimental results are shown in Table 1.

4. Baking result: a toast (for every toast to be used, the size, shape and manufacturing method is the same) is placed in a certain baking utensil and placed in an enamel oven in the prior art and the far-infrared enamel oven according to Examples 1-11. The oven of the prior art and the far-infrared enamel oven have the same parameters except for the baking tray. A baking time is set as 3 min, and after the toast was baked for 3 minutes, coloring uniformity and coloring area of the toast surface were determined.

TABLE 1

Test data

| | Temp. (° C.) | Water contact angle (°) | Settling and thixotropic properties of the coating | Baking result |
|---|---|---|---|---|
| Example 1 | 247 | 116 | excellent | The surface of the toast is colored uniformly, the shade of the toast is good, and the coloring area reaches 95% of the surface of the toast. |
| Example 2 | 238 | 112 | excellent | The surface of the toast is colored uniformly, the shade of the toast is good, and the coloring area reaches 95% of the surface of the toast. |
| Example 3 | 229 | 107 | excellent | The surface of the toast is colored uniformly, the shade of the toast is good, and the coloring area reaches 95% of the surface of the toast. |
| Example 4 | 226 | 112 | excellent | The surface of the toast is colored uniformly, the shade of the toast is good, and the coloring area reaches 90% of the surface of the toast. |
| Example 5 | 211 | 104 | excellent | The surface of the toast is colored uniformly, the shade of the toast is good, and the coloring area reaches 85% of the surface of the toast. |
| Example 6 | 219 | 107 | excellent | The surface of the toast is colored uniformly, the shade of the toast is good, and the coloring area reaches 85% of the surface of the toast. |
| Example 7 | 210 | 105 | excellent | The surface of the toast is colored uniformly, the shade of the toast is good, and the coloring area reaches 85% of the surface of the toast. |
| Example 8 | 205 | 100 | good | The surface of the toast is colored uniformly, the shade of the toast is good, and the coloring area reaches 80% of the surface of the toast. |
| Example 9 | 338 | 101 | excellent | The surface of the toast is colored uniformly, the shade of the toast is good, and the coloring area reaches 95% of the surface of the toast. |
| Comparative Example 1 | 162 | 111 | bad | The surface of the toast is colored uniformly, the shade of the toast is good, and the coloring area reaches 70% of the surface of the toast. |
| Comparative Example 2 | 165 | 111 | bad | The surface of the toast is colored uniformly, the shade of the toast is good, and the coloring area reaches 70% of the surface of the toast. |
| Comparative Example 3 | 271 | 100 | excellent | The surface of the toast is colored uniformly, the shade of the toast is good, and the coloring area reaches 95% of the surface of the toast. |
| Comparative Example 4 | 176 | 98 | excellent | The surface of the toast is colored uniformly, the shade of the toast is good, and the coloring area reaches 95% of the surface of the toast. |
| Existing resin absorbing material of the baking tray (thickness of 2 mm) | 175° C. | 95 | bad | The surface of the toast is colored non-uniformly, and the coloring area reaches 70% of the surface of the toast. |

According to the results in Table 1, it can be seen that compared with the existing resin absorbing material baking tray, the material of the present disclosure prepared by mixing the binder, the absorber, the far-infrared powder agent, the solvent, the anti-settling agent and the adjuvant has advantages of a thin coating layer to be formed, a good microwave performance, a good hydrophobic property, a good anti-settling property, and a good baking result. The proportions of Examples 1 to 9 are with a scope of "52 to 80 parts by weight of a binder, 0.5 to 2 parts by weight of an absorber, 10 to 20 parts by weight of a far-infrared powder agent, 5 to 10 parts by weight of a solvent, 1 to 15 parts by weight of an anti-settling agent, and 0.8 to 1.5 parts by weight of an adjuvant". When compared with Comparative Examples, the appropriate ranges of Examples according to the present disclosure may be used to further improve the microwave performance, the hydrophobic property, the anti-settling property and the baking result. Comparative Example 1 and Comparative Example 2 are less desirable in the baking results because the addition amount of the far-infrared powder agent is small. In Comparative Example 3 and Comparative Example 4, although the addition amount of the far-infrared powder agent is large, the coating strength is insufficient, the adhesion property is poor, and the cost is high. In conclusion, the scope of "52 to 80 parts by weight of a binder, 0.5 to 2 parts by weight of an absorber, 10 to 20 parts by weight of a far-infrared powder agent, 5 to 10 parts by weight of a solvent, 1 to 15 parts by weight of an anti-settling agent, and 0.8 to 1.5 parts by weight of an adjuvant" is appropriate.

The results of Example 10 are similar to those of Example 6, and thus the specific data of Example 10 is not listed.

A proper amount of the dispersant is used together with other components to prepare the absorbing material of the present disclosure, thus solving the problems such as the absorber is not uniformly dispersed and easy to settle, which will result in a big difference in microwave absorbing properties of the products having the same specification type in the same batch, and even causes a local overheating and melting of the products.

The preparation method according to the present disclosure avoids the use of a large amount of the organic resin in the traditional baking tray absorbing material, and thus overcomes the disadvantage of a large thickness existing in the prior art. In the present disclosure, the hydrophobic aerosil is used together with the high temperature resistant binder and the absorber having excellent absorbing properties, and thus the coating having absorbing properties may be achieved even under the condition of a small thickness of the coating. On this basis, the thickness is reduced from 2 mm of the prior art to the 50 μm of the present disclosure, thus reducing the thickness of the absorbing material, the avoiding the use of a large amount of the silica sol material.

A proper amount of the far-infrared powder agent is added in the absorbing material system to improve the ability for penetrating the food, such that the inside of the food may better absorb the energy, thus cooking the inside and the surface of the food synchronously and improving the cooking effect of the microwave appliance, which solves the problems of lacking the far-infrared performance and the inside of the food being underdone existing in the art.

A simple pre-treatment of the substrate is performed and then the absorbing material prepared by the method according to the present disclosure is sprayed on the surface of the workpiece. The coating has a thickness of about 50 μm. Compared with the existing absorbing material, the process is less complex, and thus the problem of complex, time-consuming and costly process is solved.

In the present disclosure, by adding the hydrophobic aerosil into the absorbing material system, besides solving the problem of the settlement of the absorber, an antibacterial function is realized without negatively affecting the hydrophobic and oleophobic properties and the absorbing property, and thus the material prepared may have a good antibacterial function. Thus, the problems that the product has no hydrophobic property and oily will be easily adhered after the product is used for a period can be solved.

In addition to the binders having the specific product names described in embodiments of the present disclosure, other binders having high temperature resistance and hydrophobic and oleophobic properties which can achieve similar performances may also applied and within the scope of the present disclosure.

In addition to the absorbers having specific product names described in the present disclosure, other absorbers having high absorbing properties and being able to achieve similar performances may also applied and within the scope of the present disclosure.

In addition to the far-infrared powder agents described in the present disclosure, other materials having good far-infrared radiation properties and being able to achieve similar performances may also applied and within the scope of the present disclosure.

In addition to the specific hydrophobic aerosil types described in the present disclosure, other hydrophobic aerosil materials able to achieve similar properties may also applied and within the scope of the present disclosure.

In addition to the adjuvants described in the present disclosure, other adjuvants having dispersing, defoaming and adhering functions and being able to achieve similar performances may also applied and within the scope of the present disclosure.

Adjustments of the preparation process and the stirring speed of the present disclosure which achieve similar performances are also within the scope of the present disclosure.

What is claimed is:

1. A hydrophobic anti-settling far-infrared absorbing material, comprising:
    52 to 80 parts by weight of a binder,
    0.5 to 2 parts by weight of an absorber,
    10 to 20 parts by weight of a far-infrared powder agent,
    5 to 10 parts by weight of a solvent,
    1 to 15 parts by weight of an anti-settling agent, and
    0.8 to 1.5 parts by weight of an adjuvant.

2. The hydrophobic anti-settling far-infrared absorbing material according to claim 1, wherein the binder is a hybridized product of a sol and an organic silicon resin.

3. The hydrophobic anti-settling far-infrared absorbing material according to claim 2, wherein the sol is selected from a silica sol, an aluminum sol, a zirconium sol or mixtures thereof.

4. The hydrophobic anti-settling far-infrared absorbing material according to claim 3, wherein a content of an effective substance in the silica sol is in a range of 20% to 40%, a content of an effective substance in the aluminum sol is in a range of 20% to 40%, and a content of an effective substance in the zirconium sol is in a range of 15% to 25%.

5. The hydrophobic anti-settling far-infrared absorbing material according to claim 1, wherein the absorber consists of
    a component A being acicular zinc oxide whiskers and/or graphite foils, and
    a component B selected from a lanthanum oxide, a cerium oxide, a neodymium oxide or mixtures thereof.

6. The hydrophobic anti-settling far-infrared absorbing material according to claim 5, wherein the lanthanum oxide has a grain size of less than 30 nm, the cerium oxide has a grain size of less than 30 nm, and the neodymium oxide has a grain size of less than 30 nm.

7. The hydrophobic anti-settling far-infrared absorbing material according to claim 1, wherein the solvent is selected from n-butanol, isobutanol, isopropanol or mixtures thereof.

8. The hydrophobic anti-settling far-infrared absorbing material according to claim 1, wherein the anti-settling agent is a hydrophobic aerosil.

9. The hydrophobic anti-settling far-infrared absorbing material according to claim 1, wherein the adjuvant is selected from a dispersant, an antifoaming agent, an adhesion promoter or mixtures thereof.

10. The hydrophobic anti-settling far-infrared absorbing material according to claim 1, wherein the far-infrared powder agent is selected from any two or more of a silicon carbide, an iron oxide, a magnesium oxide, a zinc oxide and an aluminum oxide.

11. A method for preparing a hydrophobic anti-settling far-infrared absorbing material, comprising:
uniformly mixing components in proportion according to claim 1 to obtain the hydrophobic anti-settling far-infrared absorbing material.

12. The method for preparing a hydrophobic anti-settling far-infrared absorbing material according to claim 11, wherein the adjuvant comprises a dispersant, an antifoaming agent and an adhesion promoter; and the method for preparing the hydrophobic anti-settling far-infrared absorbing material comprises:

1) preparation of a dispersant-binder mixed system:
uniformly mixing the binder and a part of the dispersant in proportion to prepare the dispersant-binder mixed system;

2) preparation of an anti-settling system:
adding the anti-settling agent and the antifoaming agent in proportion into the mixed system prepared in step 1) and mixing uniformly to prepare the anti-settling system;

3) preparation of an anti-settling absorbing system:
adding the solvent, the absorber and the adhesion promoter into the anti-settling system prepared in step 2) to prepare the anti-settling absorbing system, wherein the solvent is added in portions;

4) preparation of the hydrophobic anti-settling far-infrared absorbing material:
adding the far-infrared powder agent and the rest of the dispersant into the anti-settling absorbing system prepared in step 3) and mixing uniformly to prepare the hydrophobic anti-settling far-infrared absorbing material.

13. A kitchen appliance product, comprising a substrate and a coating disposed on a surface of the substrate, wherein the coating is made of a hydrophobic anti-settling far-infrared absorbing material according to claim 1.

14. A method for preparing a kitchen appliance product, comprising:
spraying a hydrophobic anti-settling far-infrared absorbing material according to claim 1 on a surface of a substrate of the kitchen appliance product, and performing a curing process to form a coating of the hydrophobic anti-settling far-infrared absorbing material.

* * * * *